US007418433B2

(12) United States Patent
Sako et al.

(10) Patent No.: US 7,418,433 B2
(45) Date of Patent: Aug. 26, 2008

(54) CONTENT PROVIDING SYSTEM, CONTENT PROVIDING METHOD, CONTENT PROCESSING APPARATUS, AND PROGRAM THEREFOR

(75) Inventors: Yoichiro Sako, Tokyo (JP); Kazuko Sakurai, Tokyo (JP); Tatsuya Inokuchi, Tokyo (JP); Mitsuru Toriyama, Chiba (JP); Yoshimasa Utsumi, Tokyo (JP); Kaoru Kijima, Tokyo (JP); Takashi Kihara, Chiba (JP); Shunsuke Furukawa, Tokyo (JP)

(73) Assignee: Sony Corporation (JP)

( * ) Notice: Subject to any disclaimer, the term of this patent is extended or adjusted under 35 U.S.C. 154(b) by 809 days.

(21) Appl. No.: 10/364,327

(22) Filed: Feb. 12, 2003

(65) Prior Publication Data

US 2004/0010705 A1    Jan. 15, 2004

(30) Foreign Application Priority Data

Feb. 15, 2002    (JP) ............................ P2002-038509

(51) Int. Cl.
*G06F 17/00*    (2006.01)
*G06N 5/02*    (2006.01)
(52) U.S. Cl. ...................................................... 706/47
(58) Field of Classification Search ................. 709/246; 706/47
See application file for complete search history.

(56) References Cited

U.S. PATENT DOCUMENTS

| 5,502,726 | A | * | 3/1996 | Fischer | 370/392 |
| 5,901,246 | A | * | 5/1999 | Hoffberg et al. | 382/209 |
| 6,081,750 | A | * | 6/2000 | Hoffberg et al. | 700/17 |
| 6,119,109 | A | * | 9/2000 | Muratani et al. | 705/400 |
| 6,266,681 | B1 | * | 7/2001 | Guthrie | 715/501.1 |
| 6,343,323 | B1 | * | 1/2002 | Kalpio et al. | 709/229 |
| 6,381,639 | B1 | * | 4/2002 | Thebaut et al. | 709/222 |
| 6,400,996 | B1 | * | 6/2002 | Hoffberg et al. | 700/83 |
| 6,418,424 | B1 | * | 7/2002 | Hoffberg et al. | 706/21 |
| 6,515,212 | B2 | * | 2/2003 | Taira et al. | 84/609 |
| 6,606,663 | B1 | * | 8/2003 | Liao et al. | 709/229 |

(Continued)

FOREIGN PATENT DOCUMENTS

JP    11-096258    4/1999

(Continued)

OTHER PUBLICATIONS

A methodology to find Web site keywords Velasquez, J.D.; Weber, R.; Yashuda, H.; Aoki, T.; e-Technology, e-Commerce and e-Service, 2004. EEE '04. 2004 IEEE International Conference on Mar. 28-31, 2004 pp. 285-292 Digital Object Identifier 10.1109/EEE.2004. 1287324.*

(Continued)

*Primary Examiner*—Michael B Holmes
(74) *Attorney, Agent, or Firm*—Rader Fishman & Grauer PLLC; Ronald P. Kananen

(57) ABSTRACT

A method for processing content data includes the steps of, when content data is transmitted from a data provider, adding usage rule information prescribing a rule of usage of the content data to the content data and transmitting the content data with the usage rule information; receiving the transmitted content data; extracting the usage rule information from the received content data; and notifying a user of the content data of the extracted usage information.

27 Claims, 15 Drawing Sheets

U.S. PATENT DOCUMENTS

| | | | | |
|---|---|---|---|---|
| 6,640,145 | B2 * | 10/2003 | Hoffberg et al. | 700/83 |
| 6,791,922 | B2 * | 9/2004 | Suzuki | 369/47.3 |
| 6,850,252 | B1 * | 2/2005 | Hoffberg | 715/716 |
| 7,006,881 | B1 * | 2/2006 | Hoffberg et al. | 700/83 |
| 7,136,710 | B1 * | 11/2006 | Hoffberg et al. | 700/83 |
| 7,334,025 | B2 * | 2/2008 | Kuriya | 709/219 |
| 7,350,238 | B2 * | 3/2008 | Abe et al. | 726/29 |

FOREIGN PATENT DOCUMENTS

| | | |
|---|---|---|
| JP | 2000-298689 | 10/2000 |
| JP | 2000-341628 | 12/2000 |
| JP | 2000-348105 | 12/2000 |
| JP | 2001-250010 | 9/2001 |

OTHER PUBLICATIONS

PFC units sizing in steel factory harmonics environment: a case study Baggini, A.; Bua, F.; Buratti, F.; Ascolari, A.; Electrical Power Quality and Utilisation, 2007. EPQU 2007. 9th International Conference Oct. 9-11, 2007 pp. 1-6 Digital Object Identifier 10.1109/EPQU. 2007.4424117.*

Japanese Office Action issued in corresponding application No. JP2002-038509 dated Jul. 17, 2007.

Japanese Office Action dated Dec. 25, 2007 for corresponding Japanese Application No. 2002-038509.

* cited by examiner

CONTENT PROVIDING SYSTEM, CONTENT PROVIDING METHOD, CONTENT PROCESSING APPARATUS, AND PROGRAM THEREFOR

BACKGROUND OF THE INVENTION

1. Field of the Invention

The present invention relates to a method of processing content data, an apparatus for providing content data, and an apparatus for processing content data. More particularly, the present invention relates to a method of processing content data on the basis of usage rule information, an apparatus for supplying content data on the basis of usage rule information, and an apparatus for processing content data on the basis of usage rule information.

2. Description of the Related Art

In recent years, a great reduction in price for Internet connection service has been achieved. This has made it possible for ordinary people to always get access to the Internet via a high-speed line. As a result of such an improvement in the Internet connection environment, it has become very popular to distribute content data via the Internet.

In the present invention, the term "content data" is intended to describe a wide variety of information which is provided for use by users from an information provider, such as music information, moving picture information, book information, and game programs.

For example, in a music content distribution service using the Internet, such as EMD (Electronic Music Distribution), dedicated software is generally preinstalled in personal computers of users to perform necessary processing such as access to a content providing server on the Internet, downloading of music content data, and accounting. This allows users to easily purchase music content data via the Internet.

Not only such content data which need fee payment but also a great number of charge-free content data such as those produced personally for fun are distributed via the Internet.

In general, content data does not include information explicitly indicating whether or not fee payment is needed. Therefore, when a user receives content data via the Internet, the user cannot know, directly from the content data itself, whether it needs payment or it is free.

In the present environment in which a great number of contents which need payment and also those which are free are distributed, users have a mixture of purchased content data and charge-free content data. Once purchased content data and charge-free content data are mixed together, content data which are not free of charge are used without paying the fee thereof because the content data do not have a mechanism for easily indicating whether or not fee payment is needed, unless additional usage restriction processing by means of, for example, encryption is performed on the content data.

In some cases, in addition to the usage rule in terms of whether fee payment is needed, a usage rule in terms of whether copying is permitted is also specified by a copyright holder. However, also in such content data, the lack of mechanism for indicating the usage rule can cause even those users, who have intention to use content data in valid manners, to illegally copy content data against their intention.

SUMMARY OF THE INVENTION

It is therefore an object of the present invention to provide a content data processing method, which resolves the above-mentioned problem.

It is another object of the present invention to provide a content data providing apparatus, which resolves the above-mentioned problem.

It is further object of the present invention to provide a content data processing apparatus, which resolves the above-mentioned problem.

According to the present invention, there is provided a content data processing method including the steps of, when content data is transmitted from a data provider, adding usage rule information prescribing a rule of usage of the content data to the content data and transmitting the content data with the usage rule information; receiving the transmitted content data; extracting the usage rule information from the received content data; and notifying a user of the content data of the extracted usage information.

According to the present invention, there is provided a content data providing apparatus including a storage unit, an adding unit, and a transmitting unit. In the storage unit, a plurality of content data are stored. The adding unit adds usage rule information to content data read from the storage unit. The transmitting unit transmits the content data with the usage rule information added thereto by the adding unit.

According to the present invention, there is provided a content data processing apparatus including a communication unit, an extractor, a notifying unit, an input unit, and a processing unit. The communication unit receives transmitted content data. The extractor extracts the usage rule information from the content data received by the communication unit. The notifying unit notifies a user of the content data of the extracted usage rule information. The input unit is used by the user to input a command, data, or the like in accordance with the usage rule information notified by the notifying unit. The processing unit processes the content data received in accordance with a command/data input via the input unit.

DESCRIPTION OF THE PREFERRED EMBODIMENTS

The present invention are described in further detail below with reference to four embodiments in conjunction with the accompanying drawings.

First Embodiment

Figure 1:
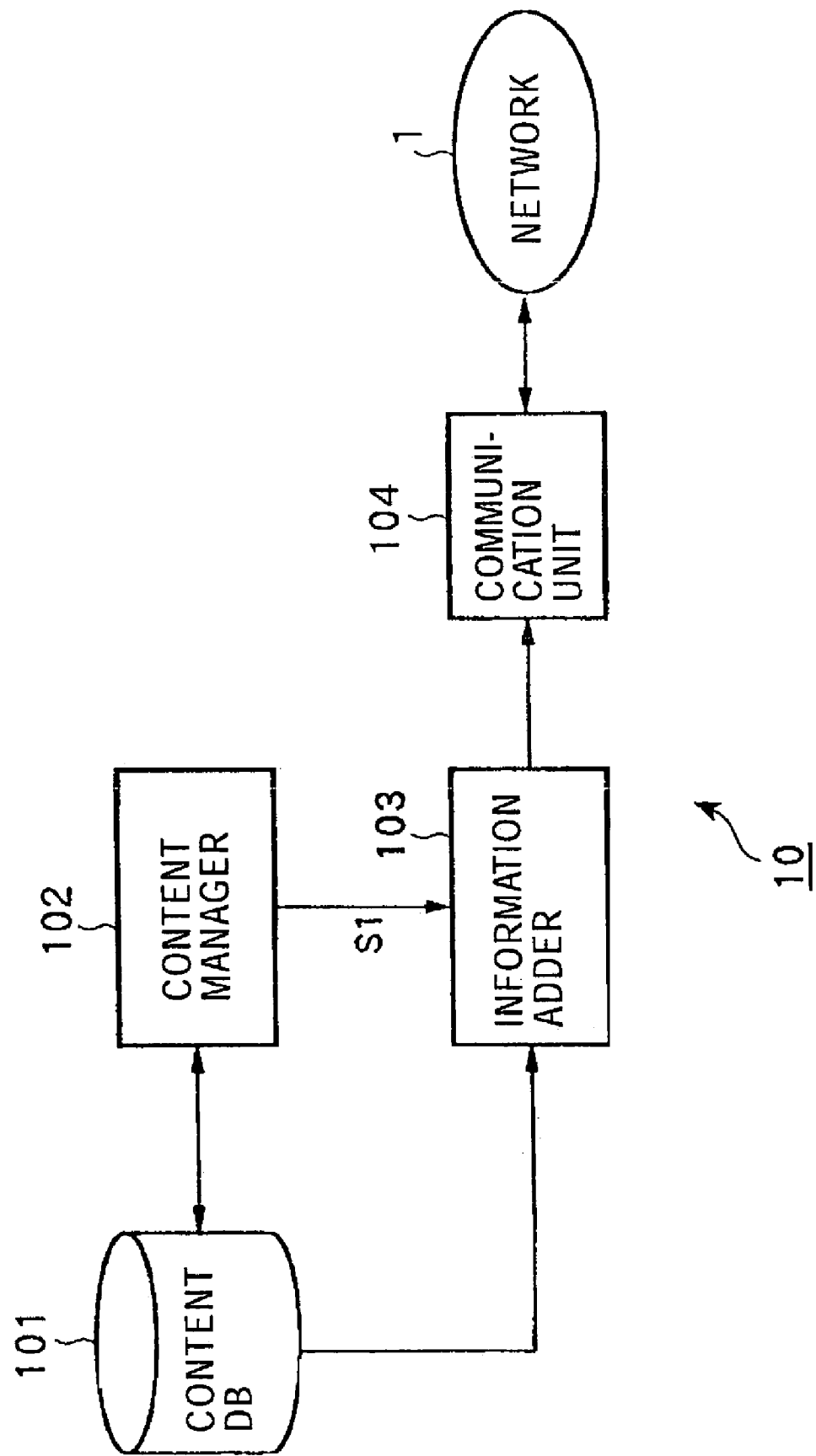
FIG. 1 is a block diagram schematically showing an example of a construction of a content providing apparatus according to a first embodiment of the present invention.

FIG. 1 is a block diagram schematically showing an example of a construction of a content providing apparatus according to a first embodiment of the present invention.

As shown in FIG. 1, this content providing apparatus 10 for providing content data includes a content database 101, a content manager 102, an information adder 103, and a communication unit 104.

The content database 101 is a database in which a plurality of content data to be provided to users are recorded or stored. Various kinds of content data such as music data, image data, document data of books, and game programs may be stored in the content database 101.

The content manager 102 manages usage rule information prescribing the rule of usage of contents stored in the content database 101. For example, the content manager 102 manages information indicating whether or not content data needs payment for usage thereof and/or information indicating whether or not copying of content data is permitted by copyright holders.

The information adder 103 reads content data to be provided to a user from the content database 101 and adds usage rule information S1, associated with the content data and received from the content manager 102, to the content data read from the content database 101. The usage rule information S1 added to the content data by the information adder 103 indicates, for example, whether or not the content data needs payment for usage thereof and/or whether or not copying of the content data is permitted.

One manner in which the information adder 103 adds information to content data is to produce a usage rule information file separately from a content file and attach the usage rule information file to the content file. Another manner is to describe usage rule information in a header of a single content file.

The information added by the information adder 103 may be code data indicating a usage rule or image data to be displayed on a display unit of a content processing apparatus, which will be described later.

Alternatively, the information adder 103 may form a content file and determine its file name so as to indicate a usage rule.

In this case, for example, the file name may consist of a first part indicating a unique name of a file and a second part (extension) indicating the type of the file, wherein those two parts are separated by a dot "." such as "unique name"+"."+ "extension", which is a form generally employed in the art. In such a format, "unique name" or "extension" may be determined so as to indicate usage rule information.

First Example of a Manner of Setting File Names

For music data in the MP3 (MPEG1 Audiolayer 3) format, "mpc" is employed as the extension of file names for data which needs fee payment, while "mpf" is employed as the extension of file names for free data.

That is, a file name for data which needs payment is given as "******.mpc", and a file name for data which is free is given as "****.mpf", wherein "******" is an arbitrary string of characters.

Second Example of a Manner of Setting File Names

A code "_c" is used to indicate that content data needs payment, and a code "_f" is sued to indicate that content data is free, and either one of codes is added at the end of a unique name.

For example, a file name for data which needs payment is given as "****_c.mp3", and a file name for data which is free is given as "**_f.mp3", wherein "****" is an arbitrary string of characters indicating a unique name.

Third Example of a Manner of Setting File Names

For music data in the WAVE format, "wav" is employed as the extension of file names for data permitted to be copied, while "waw" is employed as the extension of file names for data not permitted to be copied.

For example, a file name for a WAVE file permitted to be copied is given as "******.wav", while a file name for a WAVE file not permitted to be copied is given as "****.waw", wherein "******" is an arbitrary string of characters.

The information adder 103 has been described above.

The communication unit 104 converts the content data with the usage rule information added thereto by the information adder 103 into a signal in a format adapted to a transmission line and transmits it to a content processing apparatus. In the example shown in FIG. 1, content data is transmitted via a network 1 serving as the transmission line.

Figure 2:
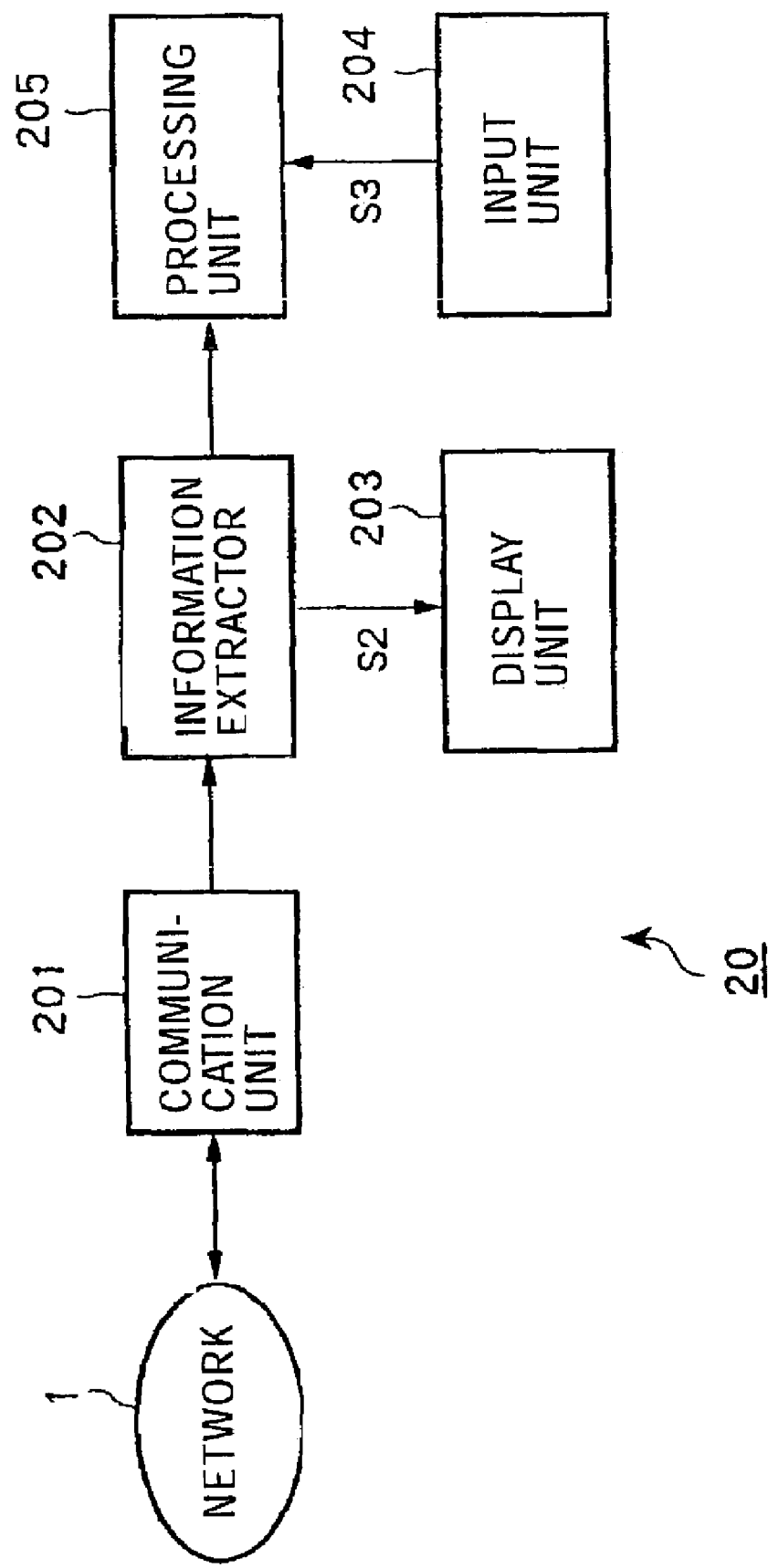
FIG. 2 is a block diagram schematically showing an example of a construction of a content processing apparatus according to the first embodiment of the present invention.

FIG. 2 is a block diagram schematically showing an example of a construction of a content processing apparatus according to the first embodiment of the present invention.

The content processing apparatus 20 shown in FIG. 2 includes a communication unit 201, an information extractor 202, a display unit 203, an input unit 204, and a processing unit 205.

The communication unit 201 receives a content signal transmitted from the content providing apparatus 10 via the network 1 and reproduces content data in the form of digital data.

The information extractor 202 extracts the usage rule information S2 from the content data received by the communication unit 201. For example, in a case in which usage rule information in the form of image data is included, the information extractor 202 extracts that image data. In a case in which a file name of a content file includes usage rule information, the information extractor 202 extracts the usage rule information from the file name.

The display unit 203 is a block for displaying the usage rule information S2 extracted by the information extractor 202 so that a user of content data can view the usage rule information. The usage rule information S2 may be presented to users in various ways via a display device such as a liquid crystal display or an audio speaker.

In a case in which the usage rule information is given in the form of data which can be reproduced by the display unit 203, the data may be reproduced and displayed. For example, in a case in which usage rule information is given in the form of image data added to content data, an image may be displayed on the display unit 203 in accordance with the image data.

In response to an inputting operation performed by a user, the input unit 204 generates a process request signal S3 indicating a request for processing of content data. More specifically, the input unit 204 includes various types of input devices such as a keyboard, a mouse, and/or a microphone, and the input unit 204 generates a process request signal S3 in response to an inputting operation performed on the input devices.

The processing unit 205 processes the content data received by the communication unit 201 in accordance with the process request signal S3. More specifically, the processing unit 205 performs various kinds of processing depending on the given content data, such as reproducing or recording of music content data, image content data, or a book content data, or executing of a program/content, in accordance with the process request signal S3.

The operation of the content providing system including the content providing apparatus 10 and the content processing apparatus 20 is described below with reference to flow charts shown in FIGS. 3 and 4.

Figure 3:
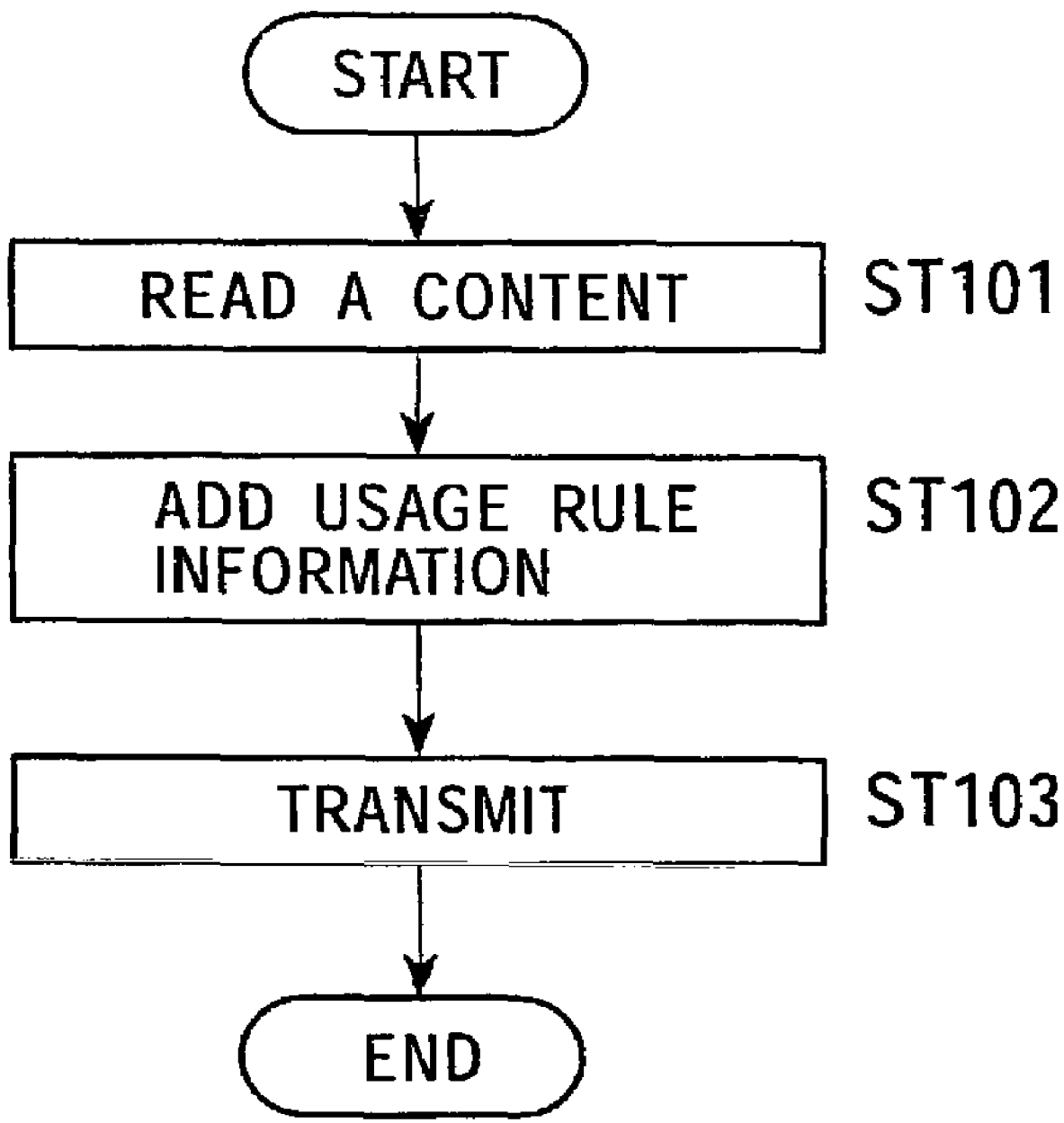
FIG. 3 is a flow chart showing a content data transmission process performed by the content providing apparatus shown in FIG. 1.

FIG. 3 is a flow chart showing a content data transmission process performed by the content providing apparatus shown in FIG. 1.

Figure 4:
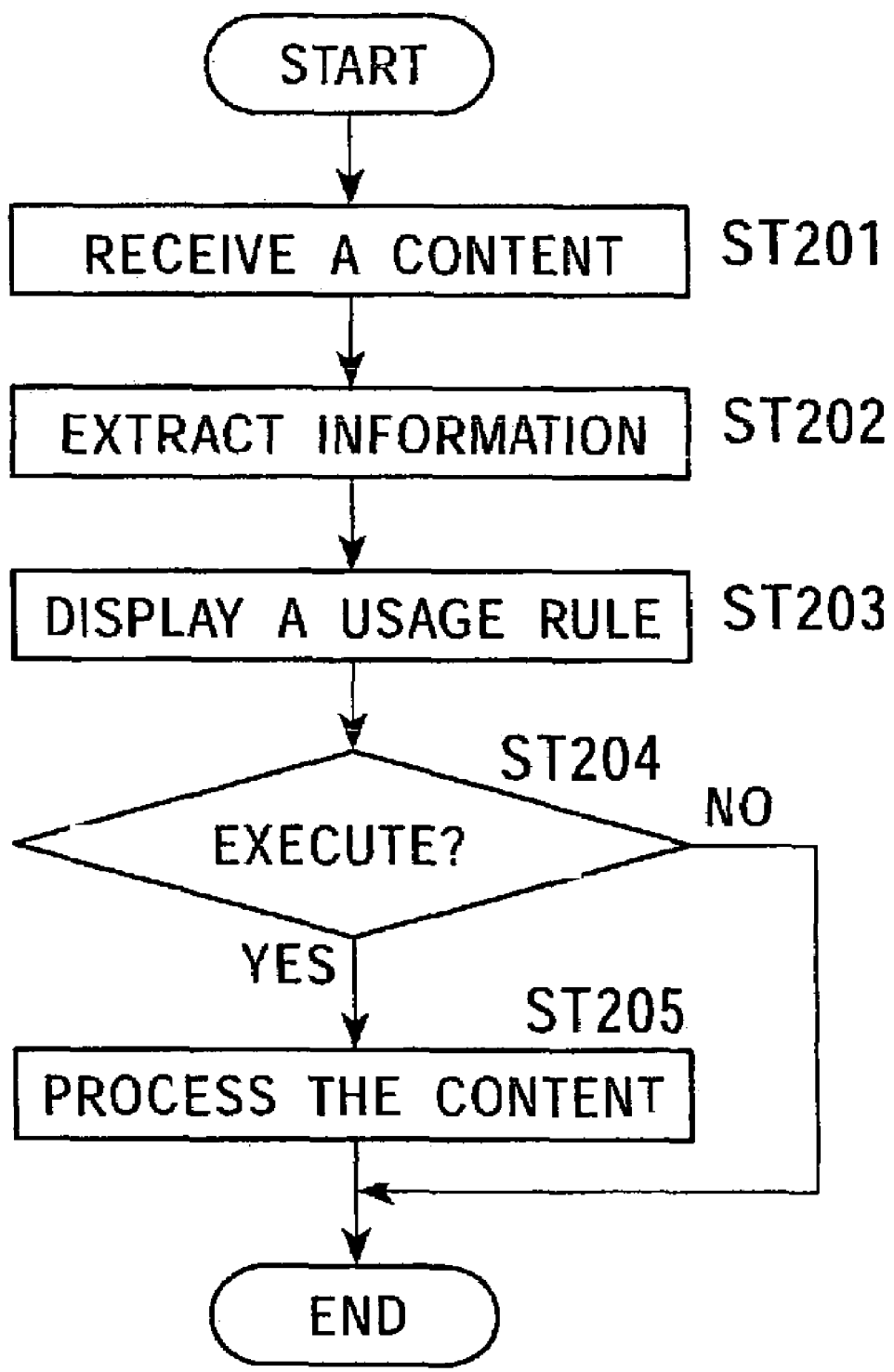
FIG. 4 is a flow chart showing a process performed on content data by the content processing apparatus shown in FIG. 2.

FIG. 4 is a flow chart showing a process performed on content data by the content processing apparatus shown in FIG. 2.

In the content providing apparatus 10, content data to be provided to the content processing apparatus 20 is read from the content database 101, and usage rule information S1 associated with the content data read from the content database 101 is output from the content manager 102 (step ST101). The information adder 103 adds the usage rule information S1 to the read content data (step ST102). The communication unit 104 converts the resultant data into a signal in a predetermined format and transmits it to the content processing apparatus 20 connected to the network 1 (step ST103).

The content signal transmitted over the network 1 is received by the communication unit 201 of the content processing apparatus 20 and reproduced into content data in the form of digital data (step ST201).

Thereafter, the information extractor 202 extracts the usage rule information S2 added to the received content data (step ST202).

In the case in which the usage rule information is included in a file name, the usage rule information S2 is extracted from the file name.

The extracted usage rule information S2 is input to the display unit 203, which displays an image and/or generates a voice/sound in accordance with the usage rule information S2 thereby informing a user of the usage rule (step ST203).

For example, image data added as the usage rule information S2 to the content data is reproduced and displayed on the display unit 203. Alternatively, image data corresponding to the usage rule information S2 may be selected from image data prestored in the content processing apparatus 10, and the selected image data may be displayed.

Figure 5A:
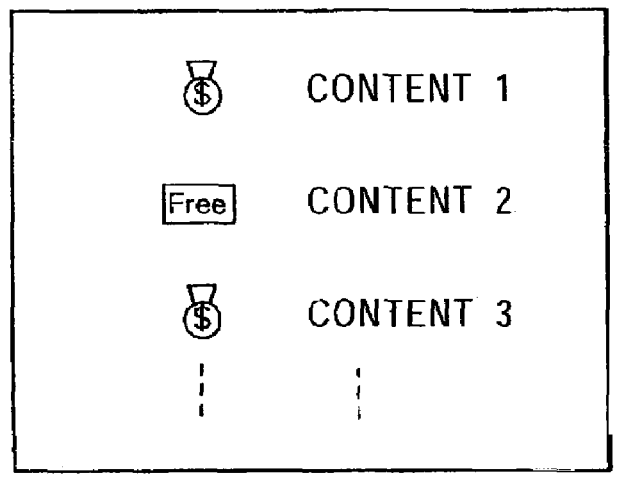
FIGS. 5A to 5C are diagrams showing examples of usage rule information displayed.
Figure 5B:
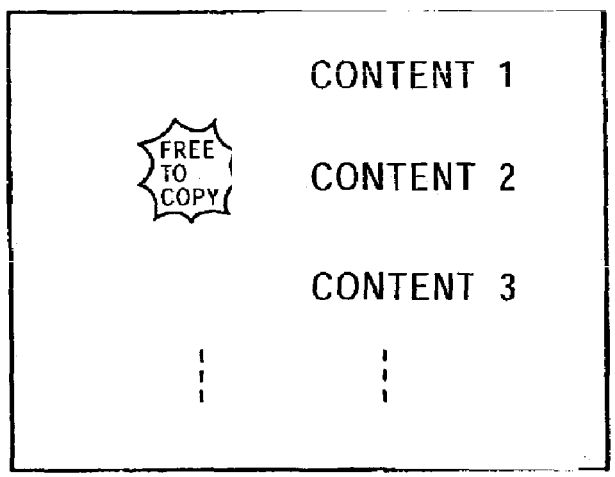
Figure 5C:
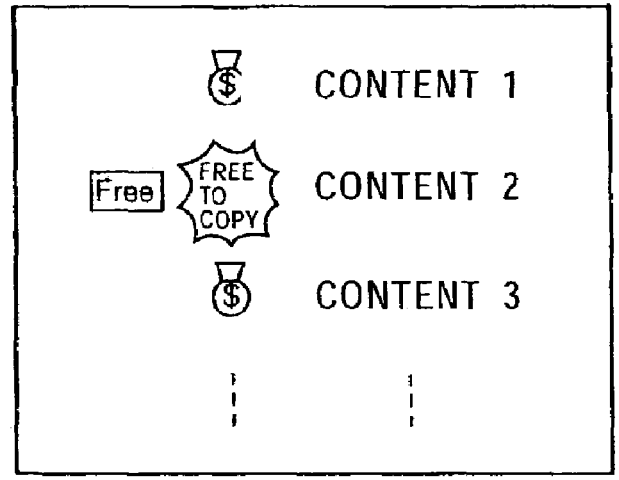

Examples of usage rule information S2 displayed on the display unit 203 are shown in FIGS. 5A to 5C.

In the example shown in FIG. 5A, a list of received content data is displayed in such a manner that a mark indicating whether content data needs payment or is free is displayed at the left end of each line in which a content name is displayed. In the example shown in FIG. 5A, "CONTENT 1" and "CONTENT 3" need payment, and "CONTENT 2" is free.

In the example shown in FIG. 5B, a mark indicating whether or not copying of content data is permitted is displayed. In this example, "CONTENT 2" is permitted to be copied, while "CONTENT 1" and "CONTENT 3" are not permitted to be copied.

In the example shown in FIG. 5C, a combination of a mark employed in FIG. 5A to indicate whether content data needs payment or is free and a mark employed in FIG. 5B to indicate whether content data is permitted to copied is displayed. In the example shown in FIG. 5C, "CONTENT 1" and "CONTENT 3" need payment and are not permitted to be copied, while "CONTENT 2" is free and is permitted to be copied.

After displaying the usage rule information on the display unit 203, the process goes into a state in which the process waits until an inputting operation is performed by the user on the input unit 204, and it is determined whether processing of content data is performed in response to an inputting operation performed by the user (step ST204). In a case in which in step ST204, a command indicating that processing of the content data should be cancelled is input to the processing unit 205 via the input unit 204, the process is cancelled. On the other hand, in step ST204, if a command indicating that processing of the content should be executed is input as the process request signal S3 to the processing unit 205, processing corresponding to the process request signal S3 is performed on the received content data (step ST205).

In the content providing system shown in FIGS. 1 and 2, as described above, usage rule information prescribing the usage rule is added in advance to content data to be provided, and the usage rule information is presented in an explicit fashion to users who want to use the content data. This lets users easily know whether provided content data needs payment and/or whether copying of the content data is permitted, and thus users can easily decide whether to use the content data without any worry. Furthermore, because usage rule information is presented in an explicit fashion when a user tries to use content data, the content data is prevented from being used in a unauthorized manner.

Second Embodiment

A second embodiment of the present invention is described below.

In this second embodiment, the processing operation of the content processing apparatus is restricted in accordance with usage rule information.

Figure 6:
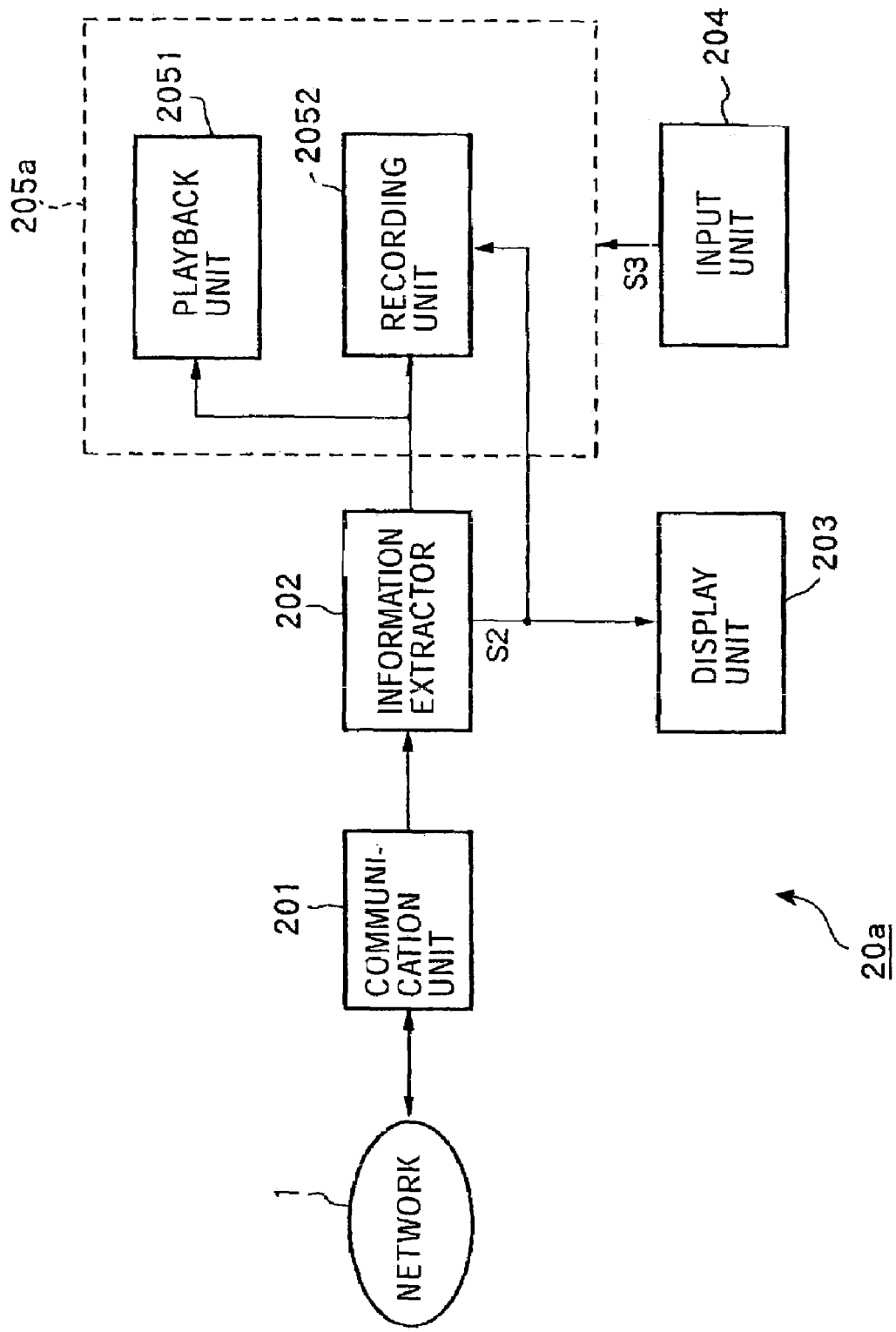
FIG. 6 is a block diagram schematically showing an example of a construction of a content processing apparatus according to a second embodiment of the present invention.

FIG. 6 is a block diagram schematically showing a construction of a content processing apparatus according to the second embodiment of the present invention.

The content processing apparatus 20a shown in FIG. 6 includes a communication unit 201, an information extractor 202, a display unit 203, an input unit 204, and a processing unit 205a. In FIG. 6, similar parts to those in FIG. 2 are denoted by similar reference numerals, and they are not described in further detail herein.

The processing unit 205a processes the content data received via the communication unit 201 in accordance with the process request signal S3, while processing of the received content data is restricted in accordance with the usage rule information S2 extracted by the information extractor 202.

For example, in the processing unit 205a including, as shown in FIG. 6, a playback unit 2051 for playing back received content data in response to the process request signal S3 and a recording unit 2052 for recording received content data in response to the process request signal S3, the playback unit 2051 performs playing back without encountering any restriction, but recording performed by the recording unit 2052 is restricted in accordance with the usage rule information S2.

More specifically, if the usage rule information S2 includes information indicating that recording of content data is permitted, the recording unit 2052 records the received content data in response to the process request signal. However, if the usage rule information S2 includes information indicating that recording of content data is not permitted, the recording unit 2052 does not record the received content data.

Figure 7:
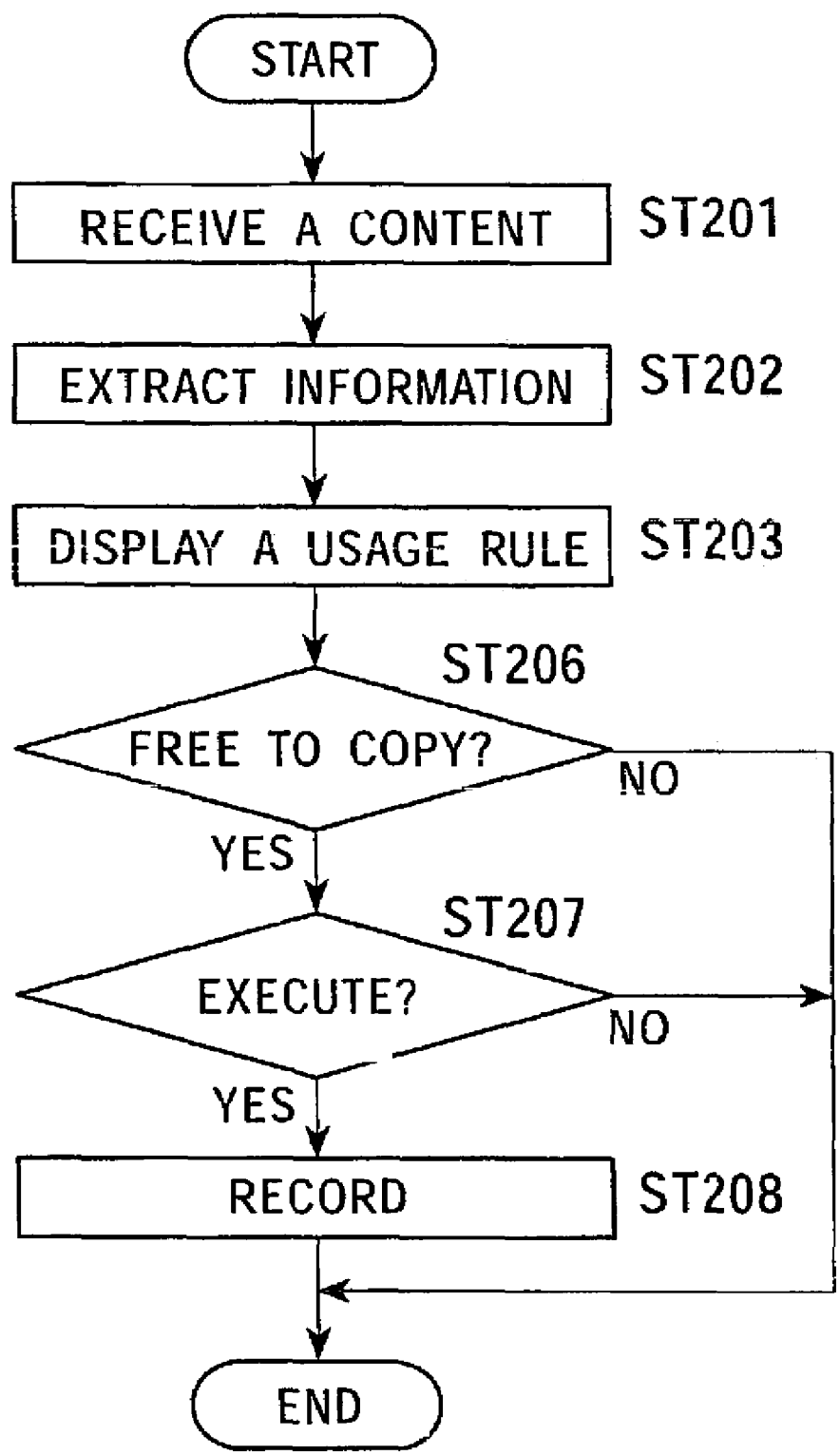
FIG. 7 is a flow chart showing a process performed on content data by the content processing apparatus shown in FIG. 6.

Referring to FIG. 7, the operation of a content providing system including the content processing apparatus 20a is described below. As for the content providing apparatus, the construction and the transmission operation thereof are similar to those described above with reference to FIG. 1, and thus a further detailed description thereof is not given herein.

FIG. 7 is a flow chart showing a content data recording process performed by the content processing apparatus 20a shown in FIG. 6. In FIG. 7, similar steps to those in FIG. 4 are denoted by similar step numbers.

The content signal transmitted over the network 1 is received by the communication unit 201 of the content processing apparatus 20 and reproduced into content data in the form of digital data (step ST201). Thereafter, the information extractor 202 extracts the usage rule information S2 added to the received content data (step ST202). The extracted usage rule information S2 is input to the display unit 203, which displays an image and/or generates a voice/sound in accordance with the usage rule information S2 thereby informing a user of the usage rule (step ST203).

Thereafter, on the basis of the extracted usage rule information S2, it is determined whether copying of the content data is permitted (step ST206). If copying is not permitted, the recording process is terminated. On the other hand, if it is determined in step ST206 that copying is permitted, the process goes into a state in which the process waits until an inputting operation is performed by a user on the input unit 204, and if inputting via the input unit 204 is performed, it is determined whether recording of the content data should be performed in response to the inputting operation (step ST207). If, in step ST207, a command indicating that recording of the content data should be cancelled is input to the processing unit 205a via the input unit 204, recording of the content data is cancelled. If, in step ST207, a record request command is input as the record request signal S2 to the processing unit 250a, the recording unit 2052 performs recording of the content data such that the received content is recorded on a recording apparatus (not shown) included in the recording unit 2052 (step ST208).

As described above, also in the content providing system including the content processing apparatus 20a shown in FIG. 6, as with the content providing system according to the first embodiment described earlier, the usage rule information associated with the provided content data is explicitly presented to users so as to let users easily know the usage rule associated with the content data. Furthermore, processing on the content data is restricted in accordance with the usage rule information, and thus the content data is prevented from being used against the usage rule.

Third Embodiment

A third embodiment of the present invention is described below.

In this third embodiment, the processing operation of the content processing apparatus is restricted in accordance with usage rule information, and content data is encrypted in accordance with the usage rule information before it is provided to users thereby ensuring that usage of content data is restricted if the usage rule information is tampered with.

Figure 8:
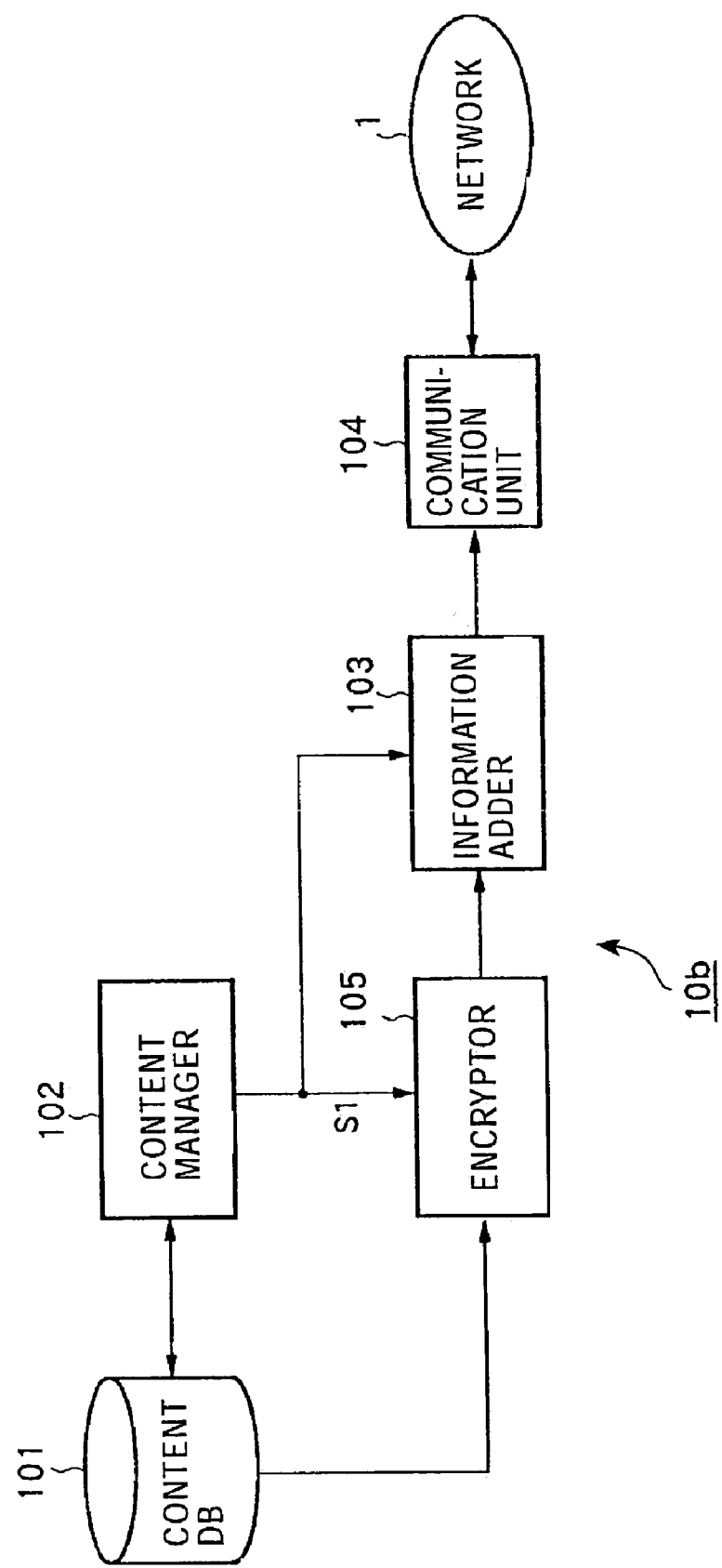
FIG. 8 is a block diagram schematically showing an example of a construction of a content providing apparatus according to a third embodiment of the present invention.

FIG. 8 is a block diagram schematically showing a construction of a content providing apparatus according to the third embodiment of the present invention.

The content providing apparatus 10b shown in FIG. 8 includes a content database 101, a content manager 102, an information adder 103, a communication unit 104, and an encryptor 105. In FIG. 8, similar parts to those in FIG. 1 are denoted by similar reference numerals.

The encryptor 105 encrypts content data read from the content database in accordance with usage rule information S1 supplied from the content manager 102 and supplies the encrypted content data to the information adder 103.

The information adder 103 adds usage rule information S1 to the content data encrypted by the encryptor 105.

Figure 9:
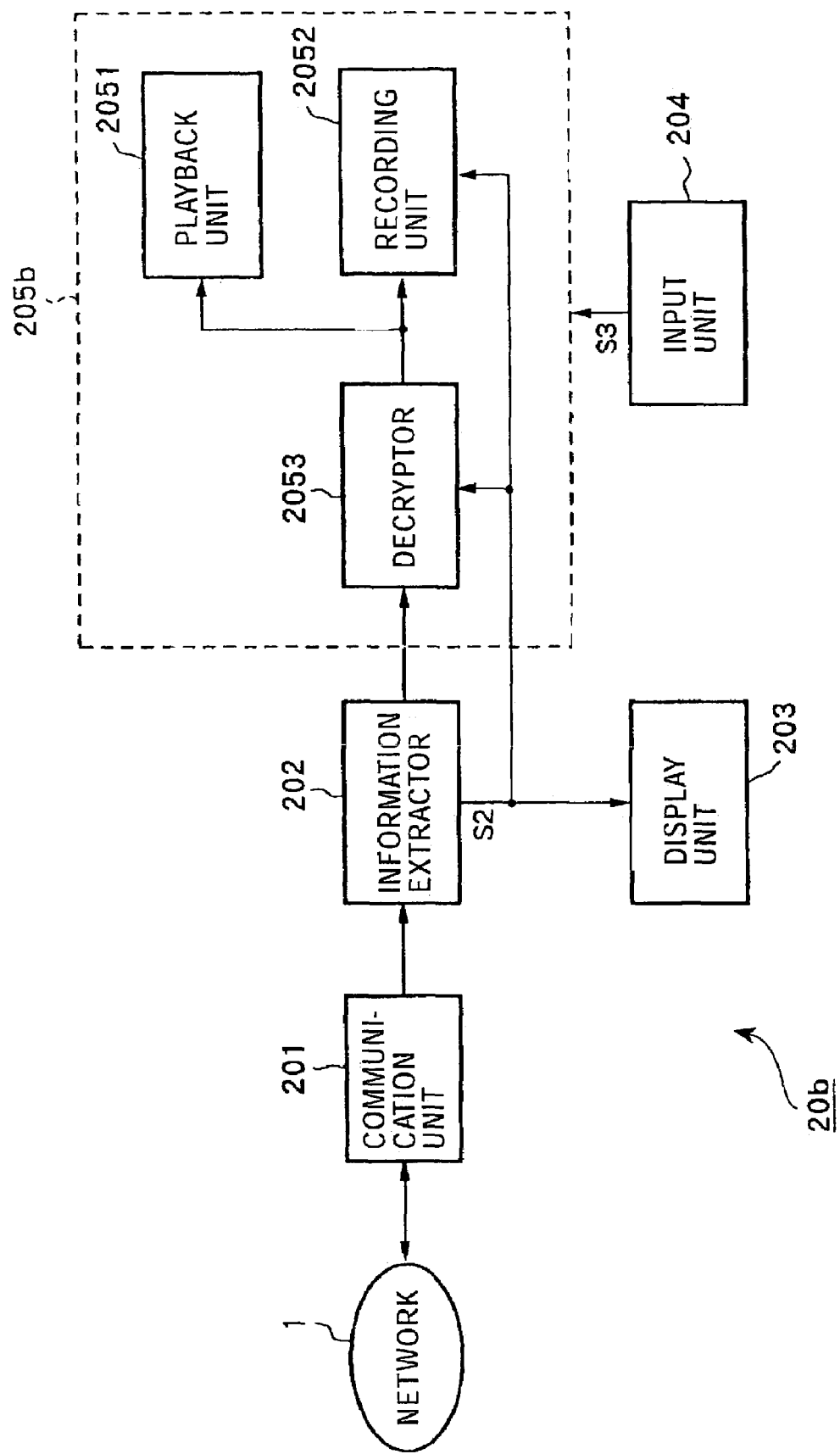
FIG. 9 is a block diagram schematically showing an example of a construction of a content processing apparatus according to the third embodiment of the present invention.

FIG. 9 is a block diagram schematically showing a construction of a content processing apparatus according to the third embodiment of the present invention.

The content processing apparatus 20b shown in FIG. 9 includes a communication unit 201, an information extractor 202, a display unit 203, an input unit 204, and a processing unit 205b. In FIG. 9, similar parts to those in FIG. 2 are denoted by similar reference numerals and they are not described in further detail herein.

The processing unit 205b decrypts the content data received by the communication unit 201, in accordance with the usage rule information S2 extracted by the information extractor 202 and processes the decrypted content data in accordance with the process request signal S3. The processing unit 205b restricts processing on the content data in accordance with the usage rule information S2.

For example, as shown in FIG. 9, the processing unit 205b includes a playback unit 2051 for playing back received content data in response to the process request signal S3, a recording unit 2052 for recording received content data in response to the process request signal S3, and a decryptor 2053 for decrypting the received content data in accordance with the usage rule information S2.

The decryptor 2053 decrypts the content data encrypted by the encryptor 105 of the content providing apparatus 10b in accordance with the extracted usage rule information S2 thereby reproducing the unencrypted original content data. The playback unit 2051 and the recording unit 2052 can perform playing back or recording of content data decrypted by the decryptor 2053, but they cannot perform playing back or recording of content data in an undecrypted form.

The operation of the content providing system including the content providing apparatus 10b and the content processing apparatus 20b is described below with reference to flow charts shown in FIGS. 10 and 11.

Figure 10:
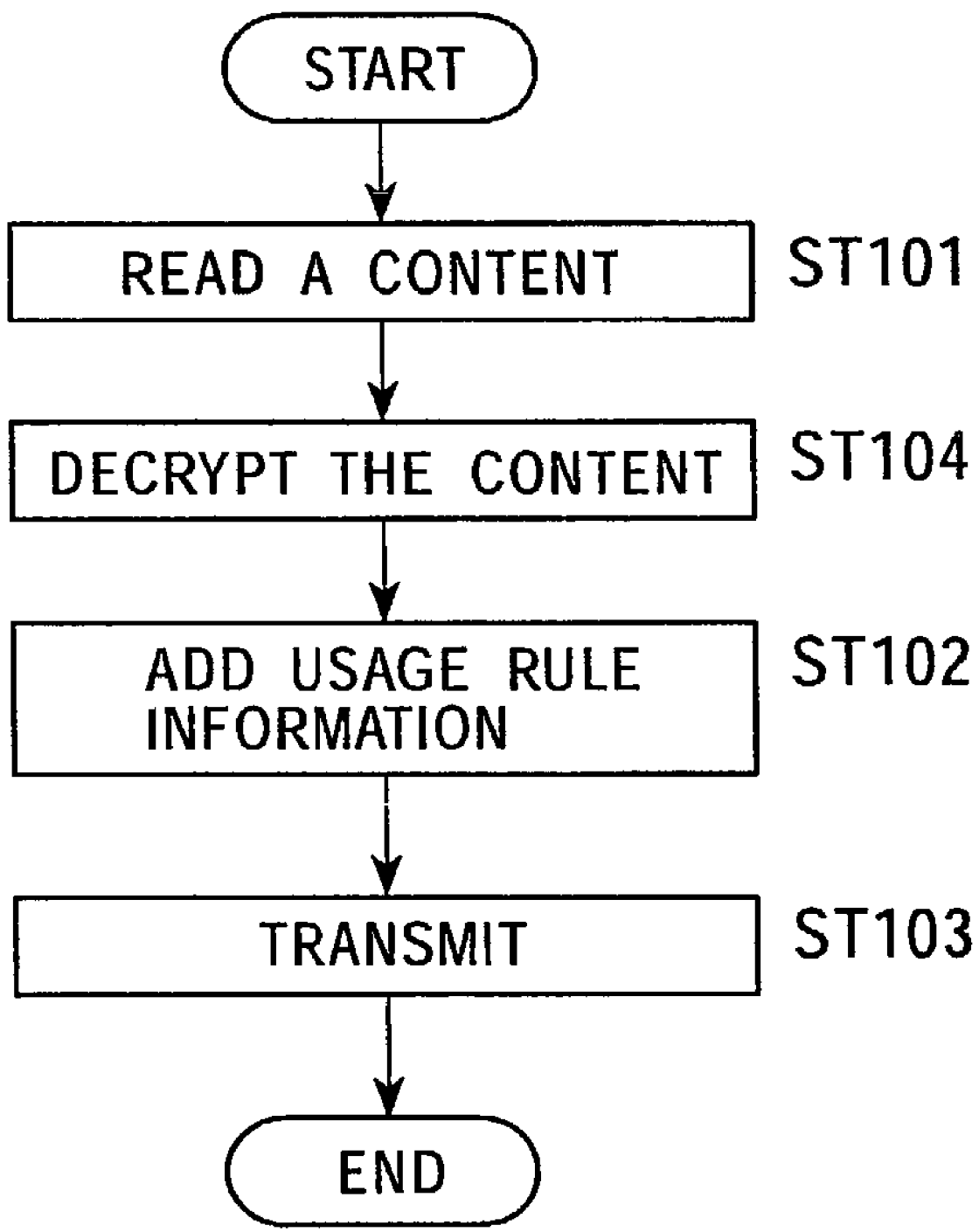
FIG. 10 is a flow chart showing a content data transmission process performed by the content providing apparatus shown in FIG. 8.

FIG. 10 is a flow chart showing a content data transmission process performed by the content providing apparatus 10b shown in FIG. 8. In FIG. 10, similar steps to those in FIG. 3 are denoted by similar step numbers.

Figure 11:
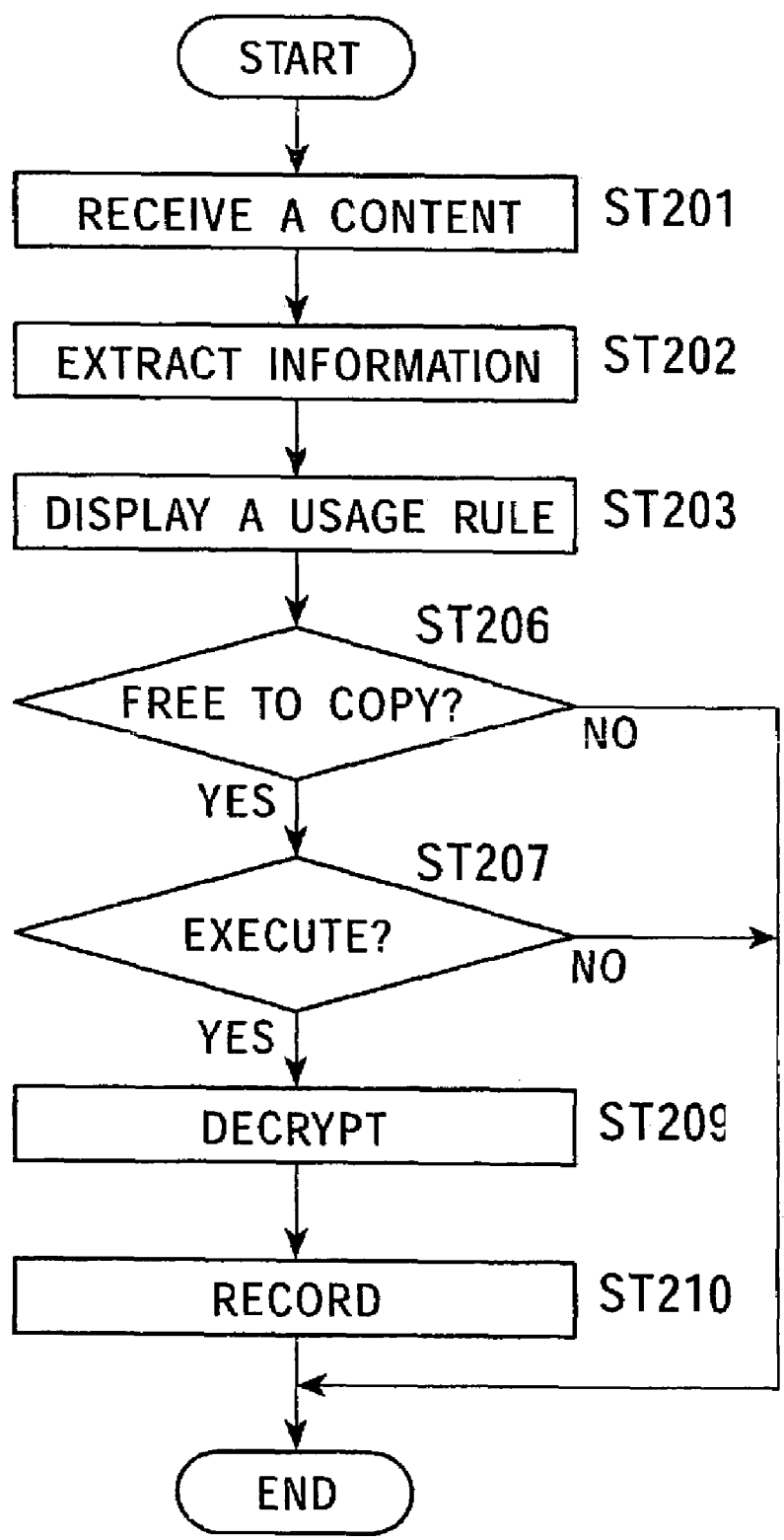
FIG. 11 is a flow chart showing a process performed on content data by the content processing apparatus shown in FIG. 9.

FIG. 11 is a flow chart showing a content recording process performed by the content processing apparatus 20b shown in FIG. 9. In FIG. 11, similar steps to those in FIG. 7 are denoted by similar step numbers.

In the content providing apparatus 10b, content data to be provided to the content processing apparatus 20b is read from the content database 101, and usage rule information S1 associated with the read content data is output from the content manager 102 (step ST101). The read content data is encrypted in accordance with the usage rule information S1 (step ST104), and the usage rule information S1 is added, by the information adder 103, to the encrypted content data (step ST102) The communication unit 104 converts the encrypted content data into a signal in a predetermined format and transmits it to the content processing apparatus 20 connected to the network 1 (step ST103).

The content signal transmitted over the network 1 is received by the communication unit 201 of the content processing apparatus 20c and reproduced into content data in the form of digital data (step ST201) Thereafter, the information extractor 202 extracts the usage rule information S2 added to the received content data (step ST202) The extracted usage rule information S2 is input to the display unit 203, which displays an image and/or generates a voice/sound in accordance with the usage rule information S2 thereby informing a user of the usage rule (step ST203).

Thereafter, on the basis of the extracted usage rule information S2, it is determined whether copying of the content data is permitted (step ST206). If copying is not permitted, the recording process is terminated. On the other hand, if it is determined in step ST206 that copying is permitted, the process goes into a state in which the process waits until an inputting operation is performed by a user on the input unit 204, and if inputting via the input unit 204 is performed, it is determined whether recording of the content data should be performed in response to the inputting operation (step ST207).

If it is determined in step ST207 that a command indicating that recording of the content data should be cancelled is input to the processing unit 205b via the input unit 204, recording of the content data is cancelled. On the other hand, if it is determined in step ST207 that a record request command has been input as the record request signal S2 to the processing unit 205b, the decryptor 2053 decrypts the received content data (step ST209), and the recording unit 2052 records the decrypted content data (step ST210).

However, in a case in which the usage rule information S2 added to the content data input to the processing unit 205b has been tampered with, for example, such that the content data, which actually needs payment, looks as if it were free, it becomes impossible for the decryptor 2053 to decrypt the content data, and thus recording of the content data is not performed against the intention of the user.

As described above, also in the content providing system constructed as shown in FIGS. 9 and 10, as with the content providing system according to the second embodiment described earlier, the usage rule information associated with the provided content data is explicitly presented to users so as to let users easily know the usage rule associated with the content data. Furthermore, processing on the content data is restricted in accordance with the usage rule information, and thus the content data is prevented from being used against the usage rule. Furthermore, because encrypted content data with tampered usage rule information cannot be decrypted, the content data is prevented from being used against the usage rule.

Fourth Embodiment

A fourth embodiment of the present invention is described below.

In this fourth embodiment, when usage rule information includes information indicating that the content data needs fee payment, a content processing apparatus performs processing only if valid payment information has been input.

Figure 12:
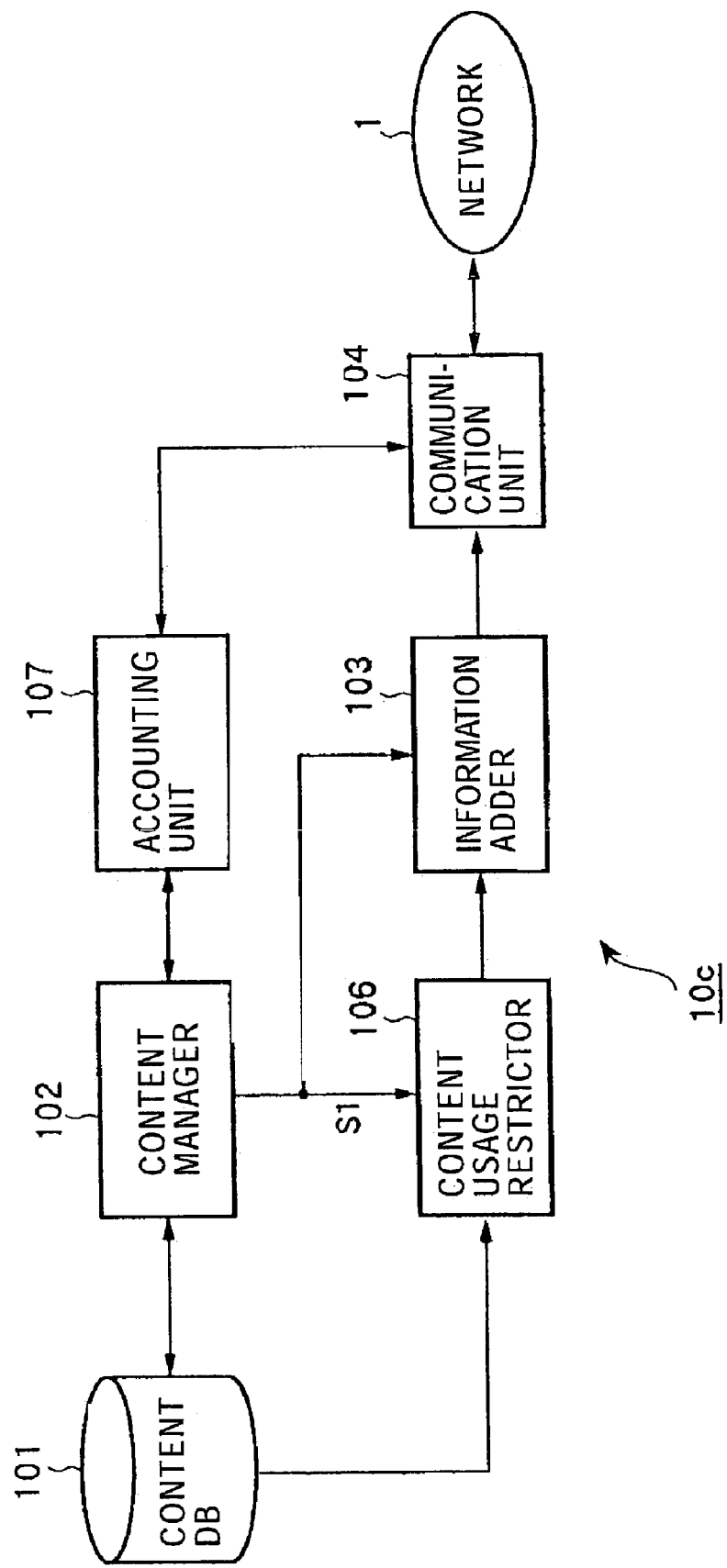
FIG. 12 is a block diagram schematically showing an example of a construction of a content providing apparatus according to a fourth embodiment of the present invention.

FIG. 12 is a block diagram schematically showing an example of a construction of a content providing apparatus according to the fourth embodiment of the present invention.

The content providing apparatus 10c shown in FIG. 12 includes a content database 101, a content manager 102, an information adder 103, a communication unit 104, and a content usage restrictor 106, and an accounting unit 107. In FIG. 12, similar parts to those in FIG. 1 are denoted by similar reference numerals, and they are not described in further detail herein.

The content usage restrictor 106 performs a usage restriction process to impose a restriction on content data read from the content database in accordance with usage rule information S1.

For example, when content data needs payment, the processing unit 106 encrypts the content data using a private key, while the content data is not encrypted if the content data is free.

The processing unit 106 may encrypt content data using a public key possessed by a user who has issued a request for the content data. This prevents the content data from being illegally used by unauthorized users other than the user who issued the request for that content data.

Content data may be encrypted using the usage rule information S1, as with the encryptor 105 shown in FIG. 8, to prevent the usage rule information S1 from being tampered with.

In response to receiving a restriction release request signal, requesting for restriction release information associated with content data, from the content processing apparatus 20c to which the content data has been provided, the accounting unit 107 compares pre-registered user authentication information with user authentication information received together with the request signal. If, the comparison indicates that the user is an authorized user, the restriction release information needed to release the restriction imposed by the content usage restrictor 106 is transmitted to the content processing apparatus 20c of that user, and information indicating the price of the content data purchased by the user is added to account information managed for each user. If the user is determined as not being an authorized user, the accounting unit 107 transmits a message, indicating that the restriction release information request has been refused, to the content processing apparatus 20c of that user.

Figure 13:
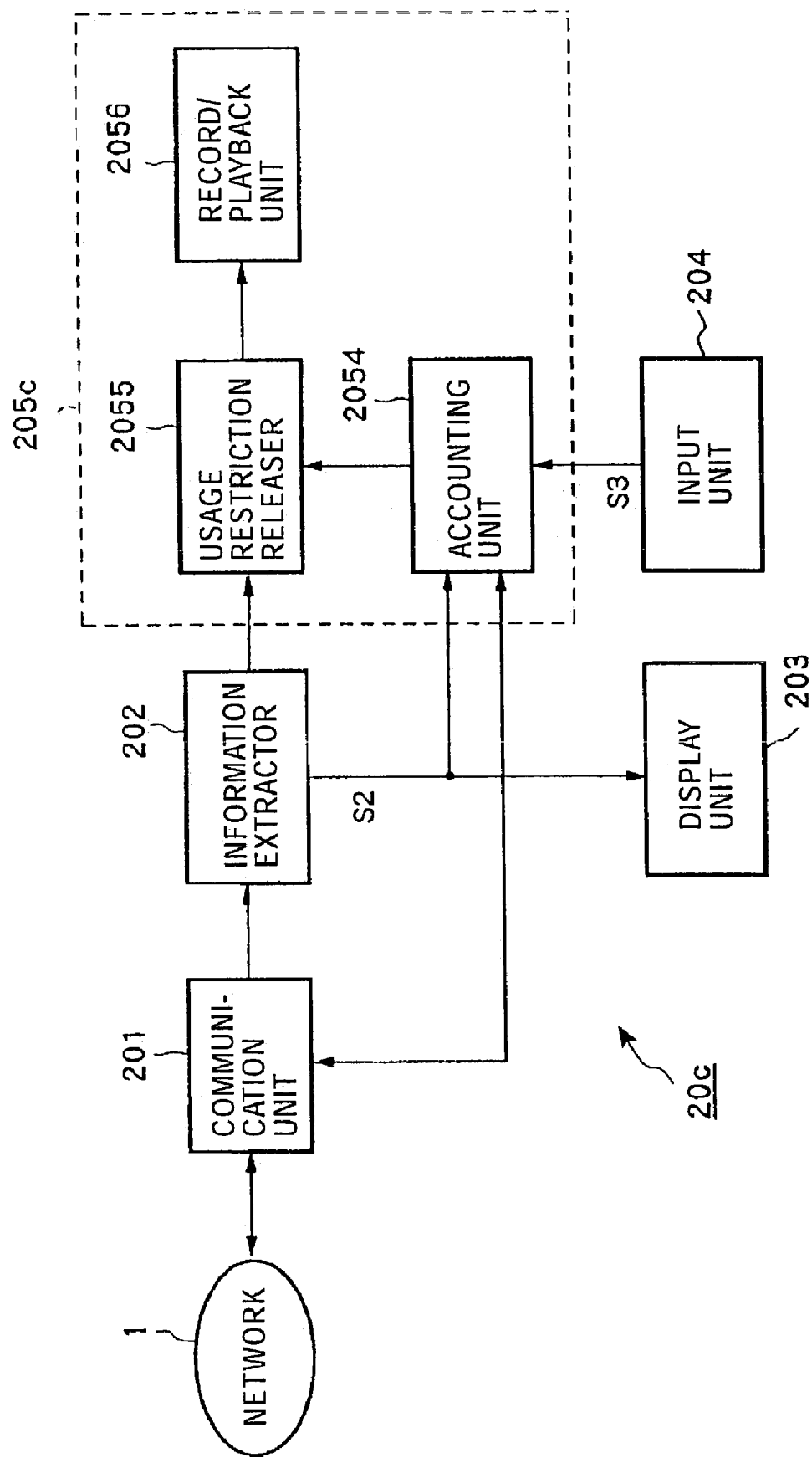
FIG. 13 is a block diagram schematically showing an example of a construction of a content processing apparatus according to the fourth embodiment of the present invention.

FIG. 13 is a block diagram schematically showing an example of a construction of a content processing apparatus according to the fourth embodiment of the present invention.

The content processing apparatus 20c shown in FIG. 13 includes a communication unit 201, an information extractor 202, a display unit 203, an input unit 204, and a processing unit 205c. In FIG. 13, similar parts to those in FIG. 2 are denoted by similar reference numerals, and they are not described in further detail herein.

When a process request signal is input via the input unit 204 to request processing of content data, if usage rule information S2 includes information indicating that use of the content data needs payment, the processing unit 205c transmits a restriction release request signal to the content providing apparatus 10c to request the content providing apparatus 10c to provide restriction release information. If the processing unit 205c receives the restriction release information transmitted in response to the restriction release request signal, the processing unit 205c releases the restriction on the usage of the content data using the received restriction release information and performs processing, such as recording or playing back, on the content data.

As shown in FIG. 13, the processing unit 205c includes an accounting unit 2054, a usage restrictor releaser 2055, and a record/playback unit 2056.

When a process request signal S3 is input via the input unit 204 to request processing of content data, if the usage rule information S2 includes information indicating that use of the content data needs payment, the accounting unit 2054 transmits a restriction release request signal to the content providing apparatus 10c to request the content providing apparatus 10c to provide restriction release information. When the restriction release request signal is transmitted, user authentication information input together with the process request signal S3 is also transmitted to the content providing apparatus 10c. If the accounting unit 2054 receives the restriction release information transmitted, in response to the request signal S3, from the content providing apparatus 10c, the accounting unit 2054 transfers the received restriction release information to the usage restriction releaser 2055. However, if a message indicating that the restriction release request has been refused is returned, processing of the content data is terminated.

Using the restriction release information supplied from the accounting unit 2054, the usage restriction releaser 2055 releases the usage restriction imposed on the content data received by the communication unit 201. For example, in a case in which the content data has been encrypted by the content usage restrictor 106 using a private key, the usage restriction releaser 2055 decrypts the encrypted content data using the private key as the restriction release information.

In a case in which the content data has been encrypted using a public key possessed by the content processing apparatus 20c, the usage restriction releaser 2055 decrypts the content data using a private key corresponding to the public key. On the other hand, in a case in which the content data has been encrypted using usage rule information, the usage restriction releaser 2055 decrypts the content data using the usage rule information S2 extracted by the information extractor 202.

The record/playback unit 2056 records or plays back the content data whose usage restriction has been released by the usage restriction releaser 2055.

The operation of the content providing system including the content providing apparatus 10c and the content processing apparatus 20c is described below with reference to flow charts shown in FIGS. 14 and 15.

Figure 14:
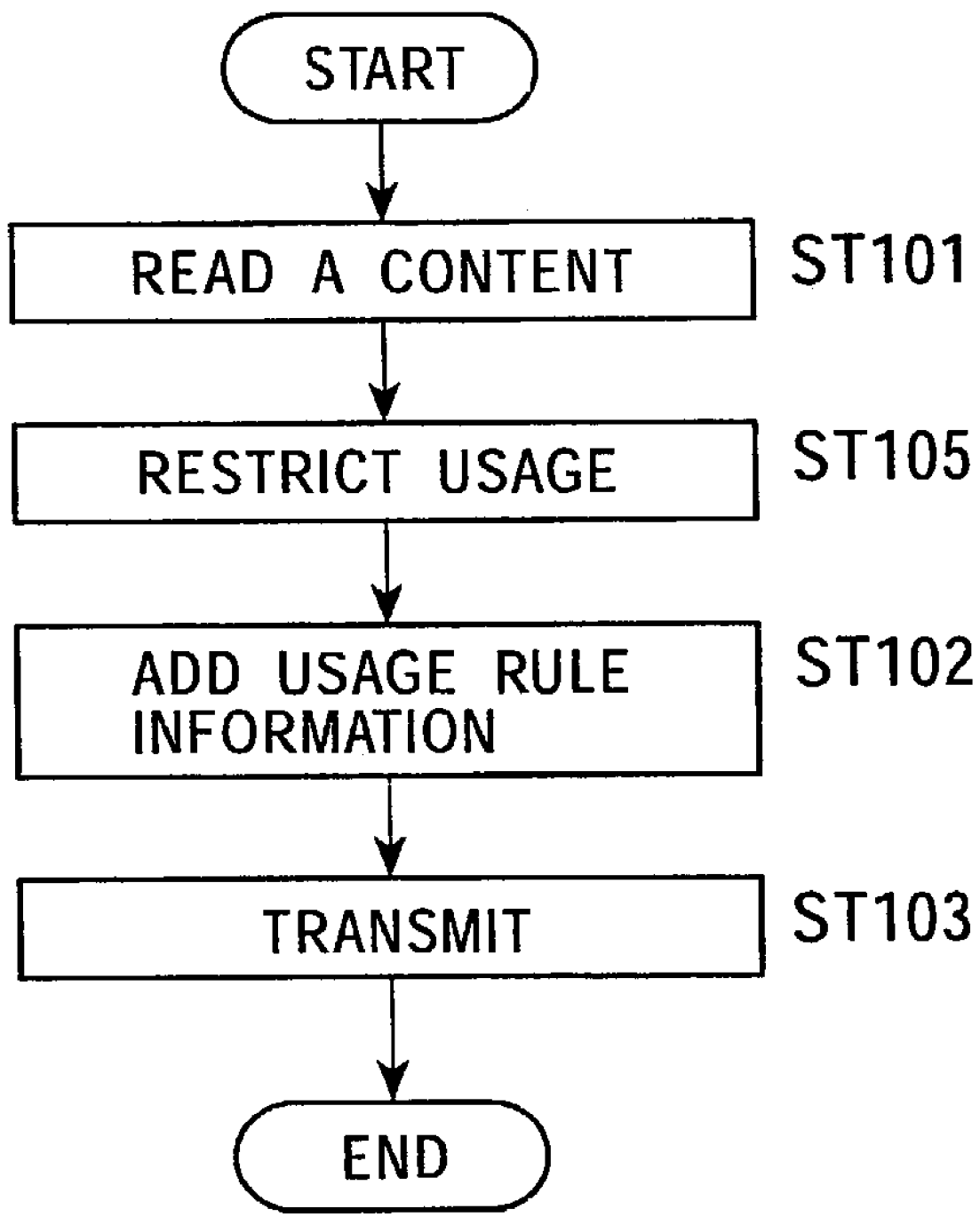
FIG. 14 is a flow chart showing a process performed on content data by the content processing apparatus shown in FIG. 12.

FIG. 14 is a flow chart showing a content data transmission process performed by the content providing apparatus 10c shown in FIG. 12, wherein In FIG. 14, similar steps to those in FIG. 3 are denoted by similar step numbers.

Figure 15:
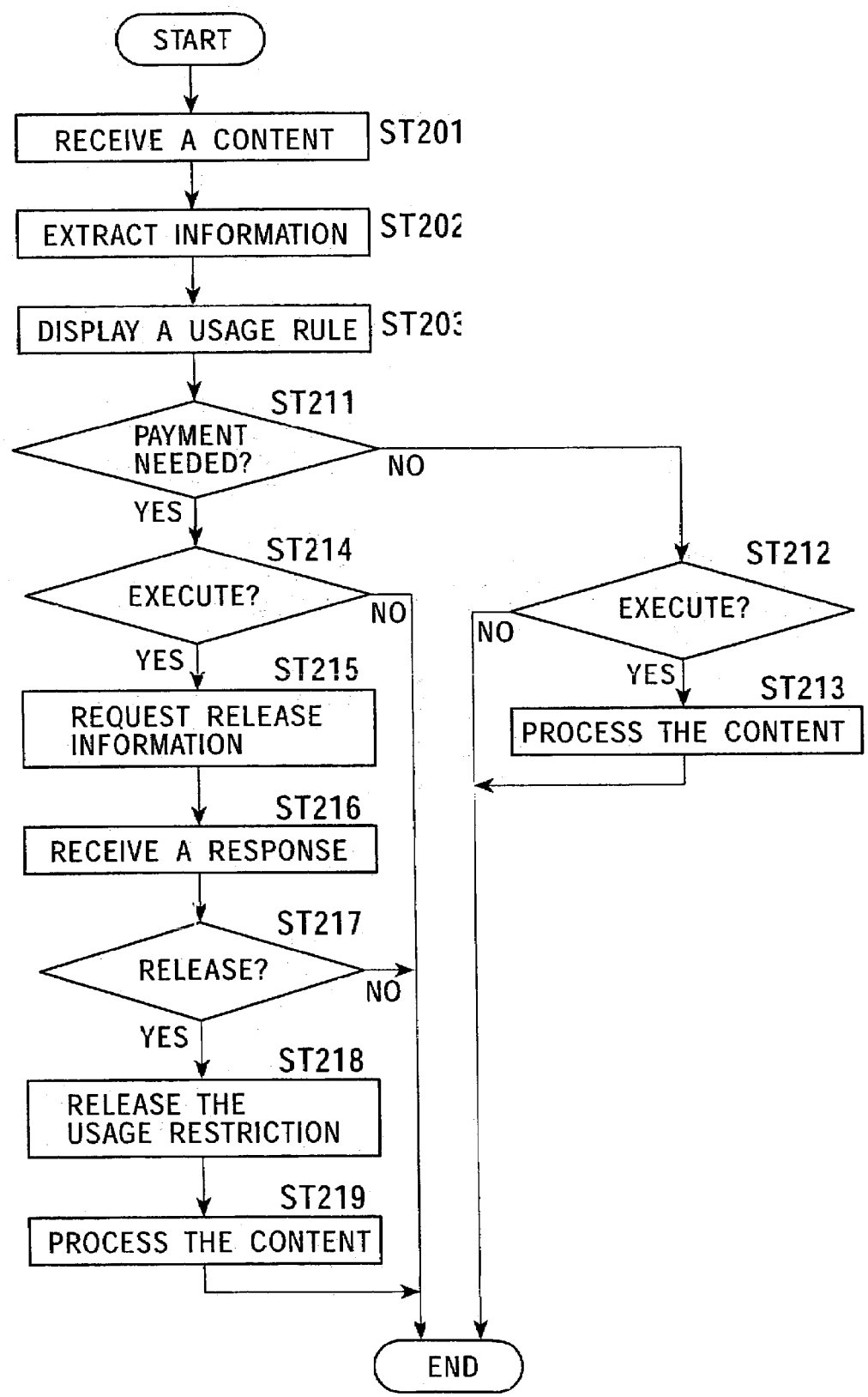
FIG. 15 is a flow chart showing a process performed on content data by the content processing apparatus shown in FIG. 13.

FIG. 15 is a flow chart showing a process performed on content data by the content processing apparatus 20c shown in FIG. 13, wherein In FIG. 15, similar steps to those in FIG. 4 are denoted by similar step numbers.

In the content providing apparatus 10c, content data to be provided to the content processing apparatus 20c is read from the content database 101, and usage rule information S1 associated with the content data read from the content database 101 is output from the content manager 102 (step ST101). In the content usage restrictor 106, information indicating usage restriction is added to the read content data, in accordance with the usage rule information S1 (step ST105) Thereafter, the usage rule information S1 is added, by the information adder 103, to the encrypted content data (step ST102). The communication unit 104 converts the content data restricted in terms of usage into a signal in a predetermined format and transmits it to the content processing apparatus 20 connected to the network 1 (step ST103).

The content signal transmitted over the network 1 is received by the communication unit 201 of the content processing apparatus 20c and reproduced into content data in the form of digital data (step ST201). Thereafter, the information extractor 202 extracts the usage rule information S2 added to the received content data (step ST202). The extracted usage rule information S2 is input to the display unit 203, which displays an image and/or generates a voice/sound in accordance with the usage rule information S2 thereby informing a user of the usage rule (step ST203).

It is determined whether the extracted usage rule information S2 indicates that the content data needs payment or is free of charge (step ST211). If the content data is free of charge, steps ST212 and ST214 are performed. However, if the content needs payment, steps ST214 to ST219 are performed.

In step ST212, the process goes into a state in which the process waits until an inputting operation is performed by a user on the input unit 204, and it is determined whether processing should be performed. If it is determined in step ST212 that a command, indicating that processing of the content data should be cancelled, has been input, processing of the content data is cancelled. However, if it is determined in step ST212 that a command to perform a process on the content data has been input to the processing unit 205c, the record/playback unit 2056 performs a process specified by the user on the content data (step ST213).

In step ST214, the process goes into a state in which the process waits until an inputting operation is performed by the user on the input unit 204, and it is determined whether processing should be performed. If it is determined in step ST214 that a command indicating that processing of the content data should be cancelled has been input, processing of the content data is cancelled. However if it is determined in step ST214 that a command to perform a process on the content data has been input to the processing unit 205c, the accounting unit 2054 transmits a restriction release request signal to the content providing apparatus 10c to request the content providing apparatus 10c to provide restriction release information (step ST215). When the restriction release request signal is transmitted in step ST215, user authentication information input via the input unit 204 is also transmitted together.

If the content providing apparatus 10c receives the request for the restriction release information, the content providing apparatus 10c compares pre-registered user authentication information with the user authentication information received together with the request signal. If the comparison indicates that the user is an authorized user, the restriction release information needed to release the restriction imposed by the content usage restrictor 106 is transmitted to the content processing apparatus 20c of the user who has issued the request. If the user is determined as not being an authorized user, a message indicating that the restriction release information request has been refused is returned to the content processing apparatus 20c (step ST216).

In the case in which the message indicating refusal to provide the restriction release information was returned from the content providing apparatus 10c, processing on the content data by the content processing apparatus 20c is cancelled. On the other hand, if the content processing apparatus 20c receives the restriction release information, the usage restriction releaser 2055 of the content processing apparatus 20c release the usage restriction imposed on the content data using the received restriction release information (step ST218). After the restriction imposed on the content data has been released, the record/playback unit 2056 performs a process specified by the user on the content data (step ST219).

As described above, also in the content providing system shown in FIGS. 12 and 16, as with the content providing system according to the first embodiment described earlier, the usage rule information associated with the provided content data is explicitly presented to users so as to let users easily know the usage rule associated with the content data.

As described above, when a user purchases content data, information explicitly indicating whether the content data needs payment or is free of charge is displayed in accordance with the usage rule information added to the content data, and thus the user can easily know whether or not content data stored on the content processing apparatus is free. Therefore, even in the case in which a large number of content data are stored in the content processing apparatus, it is possible to quickly determine whether or not each content data is free.

It will be apparent to those skilled in the art that the present invention is not limited to the details of the embodiments described above but various modifications are possible.

For example, although in the embodiments described above, content data is provided via a network, the network may be a wireless network or a cable network. The present invention may also be applied to a system in which information is provided by means of a one-way transmission from a content providing apparatus to a content processing apparatus, as with broadcasting.

Furthermore, the accounting method for charging a content fee is not limited to that employed in the content providing system described above with reference to FIGS. 12 and 13, but other various accounting methods may also be employed. For example, accounting may be performed in conjunction with prepaid cards. In this case, both the accounting process and the generation of restrict release information may be performed in the accounting unit disposed in the content processing apparatus rather than in the content providing apparatus. This makes unnecessary for the content providing apparatus to include the accounting unit.

Although all parts of the content providing apparatus and the content processing apparatus described in the respective embodiments may be formed by means of hardware, at least some parts may also be realized by a processing apparatus such as a computer which performs a process in accordance with a preinstalled program.

What is claimed is:

1. A content data processing method comprising the steps of:
   when content data is transmitted from a data provider, adding usage rule information prescribing a rule of usage of the content data to the content data and transmitting the content data with the usage rule information;
   receiving the transmitted content data;
   extracting the usage rule information from the received content data;
   notifying a user of the content data of the extracted usage information;
   restricting the operation of recording and/or reproducing the received content data, in accordance with the extracted usage rule information; and
   when the usage rule information indicates that copying of the content data is permitted, recording the received content data in response to a process request signal input in accordance with the notified usage rule information.

2. A content data processing method according to claim 1, further comprising the step of processing the received content data in accordance with a process request signal input in accordance with the notified usage rule information.

3. A content data processing method according to claim 1, further comprising the step of extracting the usage rule information from the received content data and decrypting the received content data using the usage rule information.

4. A content data processing method according to claim 3, further comprising the step of recording or reproducing the received content data in accordance with a process request signal input in accordance with the notified usage rule information.

5. A content data processing method according to claim 4, further comprising the step of:
   when the usage rule information indicates that copying of the content data is permitted, recording the received content data in response to a process request signal input in accordance with the notified usage rule information.

6. A content data processing method according to claim 1, further comprising the steps of:
   when the content data to be transmitted needs fee payment, transmitting the content data after imposing usage restriction on the content data in accordance with the usage rule information; and
   transmitting, to the data provider, a request signal to request release of the usage restriction in processing of the received content data.

7. A content data processing method according to claim 6, further comprising the steps of:
   authenticating a user of the received content data, in response to the transmitted restriction release request signal; and
   when the authentication has been successfully passed, transmitting a signal for releasing the usage restriction from the data provider.

8. A content data processing method according to claim 7, further comprising the step of:
   when the signal for releasing the usage restriction is received, recording or reproducing the received content in response to a process request signal input in accordance with the notified usage rule information.

9. A content data providing apparatus for providing content data with usage rule information for a user content data processing apparatus comprising:
   a storage unit in which a plurality of content data are stored;
   a content managing unit for managing the usage rule information corresponding to the content data;
   an addition unit for adding the usage rule information to the content data;
   a transmitting unit for transmitting the content data with the usage rule information for notifying the usage rule information to a user of the user content data processing apparatus;
   a usage restriction unit for imposing usage restriction on the content data read from the storage unit, in accordance with the usage rule information; and
   a processing unit for, in response to receiving a signal indicating a request for release of usage restriction, authenticating a user of a content data to be transmitted and generating a signal for releasing the usage restriction depending on the authentication result.

10. A content data providing apparatus according to claim 9, further comprising a generator for generating the usage rule information.

11. A user content data processing apparatus comprising:
    a communication unit for receiving transmitted content data with usage rule information corresponding to the content data from a content data providing apparatus;
    an extractor for extracting the usage rule information from the content data with the usage rule information received by the communication unit;

a display unit for notifying the extracted usage rule information to a user of the user content data processing apparatus, wherein the usage rule information includes information indicating whether copying of the content data is permitted, and when the usage rule information indicates that copying of the content data is permitted, the processing unit performs recording of the received content data in accordance with a process request signal input in accordance with the notified usage rule information.

12. A user content data processing apparatus according to claim 11, further comprising:

an input unit for inputting in accordance with the usage rule information notified by the display unit; and a processing unit for processing the received content data in accordance with the input given via the input unit, wherein the processing unit controls recording or reproducing of the received content data in accordance with the usage rule information extracted by the extractor.

13. A user content data processing apparatus according to claim 12, wherein the usage rule information includes information indicating whether copying of the content data is permitted, and when the usage rule information indicates that copying of the content data is permitted, the processing unit performs recording of the received content data in accordance with a process request signal input in accordance with the notified usage rule information.

14. A user content data processing apparatus according to claim 12, wherein the usage rule information includes information of usage restriction, and wherein said user content data processing apparatus further comprises a generator for generating a restriction release request signal to request releasing of the usage restriction in processing of the received content data.

15. A user content data processing apparatus according to claim 14, wherein when the processing unit receives a signal for releasing the usage restriction transmitted in response to the restriction release request signal, the processing unit performs processing on the received content data in response to inputting performed via the input unit.

16. A user content data processing apparatus according to claim 15, wherein the usage rule information includes information indicating whether the content data needs fee payment.

17. A content data providing method for providing content data with usage rule information for a user content data processing apparatus, the method comprising the steps of:

storing a plurality of content data;

managing the usage rule information corresponding to the content data;

adding the usage rule information to the content data;

transmitting the content data with the usage information for notifying the usage rule information to a user of the user content data processing apparatus;

imposing usage restriction on the content data read from the storage unit, in accordance with the usage rule information; and authenticating a user of a content data to be transmitted and generating a signal for releasing the usage restriction depending on the authentication result in response to receiving a signal indicating a request for release of usage restriction.

18. A content data providing method according to claim 17, further comprising the step of:

generating the usage rule information.

19. A content data processing method comprising the steps of:

receiving transmitted content data with usage rule information corresponding to the content data from a content data providing apparatus;

extracting the usage rule information from the content data with the usage rule information;

notifying the extracted usage rule information to a user; and recording of the received content data in accordance with a process request signal input in accordance with the notified usage rule information when the usage rule information indicates that copying of the content data is permitted, the usage rule information including information indicating whether copying of the content data is permitted.

20. A content data processing method according to claim 19, further comprising the steps of:

inputting in accordance with the usage rule information notified by the display unit; and processing the received content data in accordance with the input given via the input unit to control recording or reproducing of the received content data in accordance with the usage rule information extracted by the extractor.

21. A content data processing method according to claim 19, wherein the usage rule information includes information of usage restriction, and wherein said user content data processing apparatus further comprises a generator for generating a restriction release request signal to request releasing of the usage restriction in processing of the received content data.

22. A content data processing method according to claim 19, wherein processing on the received content data in response to inputting performed via the input unit is performed when the processing unit receives a signal for releasing the usage restriction transmitted in response to the restriction release request signal.

23. A content data processing method according to claim 1, when the content data is transmitted, further comprising the step of:

transmitting the content data after encrypting it.

24. A content data providing apparatus according to claim 9, further comprising:

an encrypting unit for encrypting the content data read from the stored unit.

25. A user content data processing apparatus according to claim 11, further comprising:

a decrypting unit for decrypting the received content data, wherein the received content data are data which has been encrypted using the usage rule information.

26. A content data providing method according to claim 17, further comprising the step of:

encrypting the content data read from the stored unit.

27. A content data processing method according to claim 19, wherein the received content data is data which has been encrypted, and said content data processing apparatus further comprises a decrypting unit for decrypting the received content data.

* * * * *